US006727482B2

(12) United States Patent
Bassill et al.

(10) Patent No.: US 6,727,482 B2
(45) Date of Patent: Apr. 27, 2004

(54) APPARATUS AND METHOD FOR INDUCTIVE HEATING

(76) Inventors: Nicholas Bassill, 28990 Pacific Coast Hwy., #212, Malibu, CA (US) 90265; Jih-Sheng Lai, 2204 Hardwick Dr., Blacksburg, VA (US) 24060

( * ) Notice: Subject to any disclaimer, the term of this patent is extended or adjusted under 35 U.S.C. 154(b) by 0 days.

(21) Appl. No.: 10/181,259

(22) PCT Filed: Jan. 12, 2001

(86) PCT No.: PCT/US01/01447

§ 371 (c)(1), (2), (4) Date: Nov. 19, 2002

(87) PCT Pub. No.: WO01/52602

PCT Pub. Date: Jul. 19, 2001

(65) Prior Publication Data

US 2003/0205572 A1 Nov. 6, 2003

(51) Int. Cl.[7] .......................... H05B 6/08; H05B 6/12; H02M 3/24; H02M 7/44

(52) U.S. Cl. ...................... 219/625; 219/626; 219/661; 219/663; 363/17; 363/132

(58) Field of Search ............................. 219/625, 626, 219/661, 663, 627, 662, 665, 666; 363/17, 132, 97, 98, 19, 21, 23, 25, 131

(56) References Cited

U.S. PATENT DOCUMENTS

| | | | |
|---|---|---|---|
| 4,147,910 | A | 4/1979 | Kiuchi et al. |
| 4,241,250 | A | 12/1980 | Steigerwald |
| 4,356,371 | A | 10/1982 | Kiuchi et al. |
| 4,749,836 | A | 6/1988 | Matsuo et al. |
| 4,864,479 | A | 9/1989 | Steigerwald et al. |
| 4,866,592 | A | 9/1989 | Fujii et al. |
| 5,354,971 | A | 10/1994 | Chen |
| 5,587,650 | A | 12/1996 | Massie |
| 5,715,155 | A | 2/1998 | Shahani et al. |
| 5,747,972 | A | 5/1998 | Baretich et al. |
| 5,751,561 | A | 5/1998 | Ho et al. |

*Primary Examiner*—Philip H. Leung
(74) *Attorney, Agent, or Firm*—Morgan, Lewis & Bockius LLP

(57) ABSTRACT

An induction heating method and device comprise an inductive heat source (120) having a controller (130), a resonant converter (125) and an induction coil (80). The controller (130) generates a variable frequency variable duty cycle control voltage in response to a power setting. The variable duty cycle of the control voltage decreases in response to an increase in the variable frequency of the control voltage. In response to the control voltage, the resonant power converter (125) generates an output between a first node (126) and a second node (128). Coupled between the first and second nodes (126, 128), the induction coil (80) varies the amount of heat it produces in response to the output power.

16 Claims, 7 Drawing Sheets

Voltage at 71

APPARATUS AND METHOD FOR INDUCTIVE HEATING

The present invention relates generally to inductive heating. More particularly, the invention provides a technique for variable frequency, variable duty cycle inductive heating.

BACKGROUND

A resonant power converter converts the current or voltage available from an electrical power source into a predetermined current or voltage. Applications of resonant power converters include inductive heating and cooking. Power converter output power is determined by the control voltage, $v_c$, applied to the power converter.

Power converter output power is maximum when the switching frequency of $v_c$ equals the resonant frequency of the power converter. Increasing the switching frequency above the resonant frequency enables zero voltage switching; however, it also lowers power converter output power. Conversely, decreasing the switching frequency limits power converter output power range. For applications such as inductive heaters and stoves, switching frequency must be limited to a certain range to achieve the desired heating depth.

FIG. 1 illustrates, in block diagram form, a prior power converter controller, which generates a control voltage, or voltages, in response to a power setting. Typically, three power settings are available: high, medium, and low. FIG. 2A illustrates prior art complementary control signals $v_{c1}$ and $v_{c2}$ generated in response to the high power setting; FIG. 2B illustrates prior art complementary control signals $v_{c1}$ and $v_{c2}$ generated in response to the medium power setting; and FIG. 2C illustrates prior art complementary control signals $v_{c1}$ and $v_{c2}$ generated in response to the low power setting. FIG. 2A reveals that the control voltages associated with the high power setting have a maximum switching period, $T_H$, and the lowest switching frequency. FIG. 2B shows that the control voltages associated with the medium power setting have a higher switching frequency. FIG. 2C shows that the control voltages associated with the lower power setting alternate between periods of medium setting switching and long periods of no switching; i.e., long periods in which both $v_{c1}$ and $v_{c2}$ are held at the same voltage level. Consequently, the low power setting does not produce a continuous power level, but rather a pulsating power level that may annoy users and produce poor cooking quality.

Typically, a controller for a resonant power converter uses some type of modulation: frequency modulation, phase-shift modulation, pulse-width modulation or phase-angle modulation. Perhaps the most popular of these is pulse-width modulation. However, its application is limited because its reduced conduction period prevents balancing of the energy in the resonant inductive and capacitive components, thereby making it difficult to achieve zero voltage switching. Phase-shift modulation can be used only with full-bridge resonant power converters. The zero voltage switching range available using pulse-width modulation is slightly larger than that available with pulse-width modulation; however, the conduction losses associated with phase-shift modulation are greater than those of pulse-width modulation. This is due to the additional circulating energy during phase shifting. Frequency modulation is widely used because it permits zero voltage switching over a wide frequency range. Unfortunately, frequency modulated control limits power converter output power. Phase angle modulation ensures zero voltage switching by maintaining a fixed phase angle between the output voltage and current. Phase angle modulated control also limits power converter output power.

Thus, a need exists for a controller for a resonant power converter that supports both a wide-range output power and a limited switching frequency range. Such a power converter controller would provide both the heating depth necessary for inductive heating and cooking. In addition, such a power converter controller would provide zero voltage switching.

SUMMARY

The inductive heat source of the present invention possesses a wide-range output power and a limited switching frequency range. The inductive heat source of the present invention is efficient because of zero-voltage switching and has the heating depth necessary for inductive cooking. The inductive heat source includes a variable frequency, variable duty cycle controller, a resonant power converter and an inductive coil. The controller generates a variable frequency, variable duty cycle control voltage in response to a power setting. The variable duty cycle of the control voltage decreases in response to an increase in the variable frequency of the control voltage. In response to the control voltage, the resonant power converter generates an output power between a first node and a second node. Coupled between the first and second nodes, the induction coil varies the amount of heat it produces in response to the output power.

The method of inductive heating of the present invention includes three steps. First, in response to a power setting a control voltage is generated that has a variable frequency and a variable duty cycle, which decreases in response to an increase in the variable frequency. Second, output power is generated in response to the control voltage. Third, an amount of heat is produced that depends upon a value of the output power.

BRIEF DESCRIPTION OF THE DRAWINGS

Additional features of the invention will be more readily apparent from the following detailed description and appended claims when taken in conjunction with the drawings, in which:

DETAILED DESCRIPTION

Figure 1:
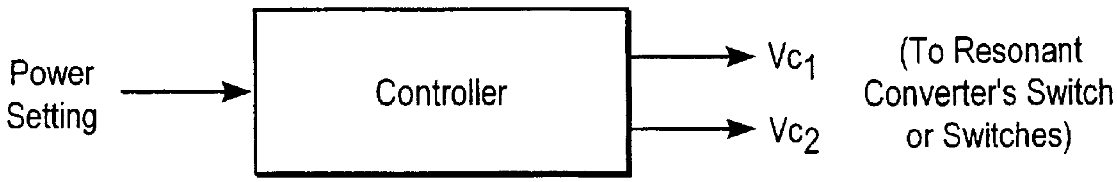
FIG. 1 (Prior Art)
FIG. 1 illustrates a prior art power converter controller for generating a control voltage in response to a power setting.
Figure 2A:
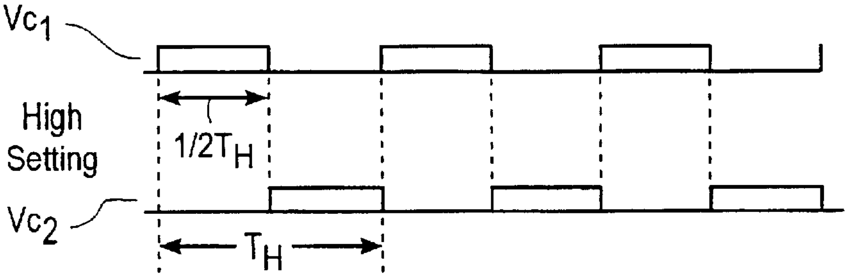
FIG. 2A (Prior Art)
FIG. 2A illustrates prior art control signals $v_{c1}$ and $v_{c2}$ generated in response to a high power setting.
Figure 2B:
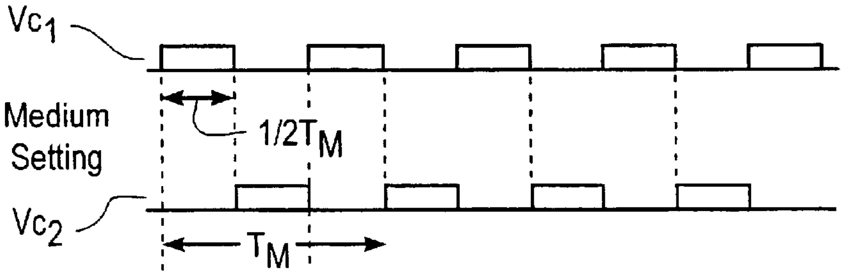
FIG. 2B (Prior Art)
FIG. 2B illustrates prior art control signals $v_{c1}$ and $v_{c2}$ generated in response to a medium power setting.
Figure 2C:
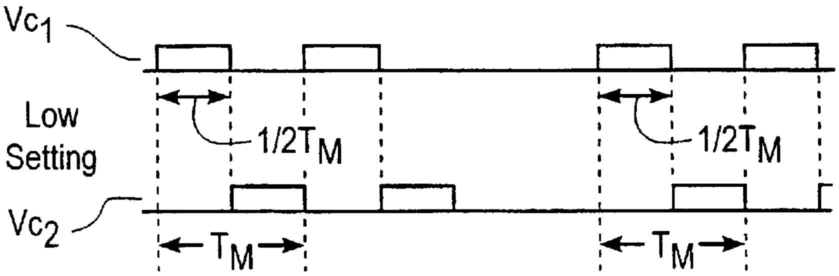
FIG. 2C (Prior Art)
FIG. 2C illustrates prior art control signals $v_{c1}$ and $v_{c2}$ generated in response to a low power setting.
Figure 3:
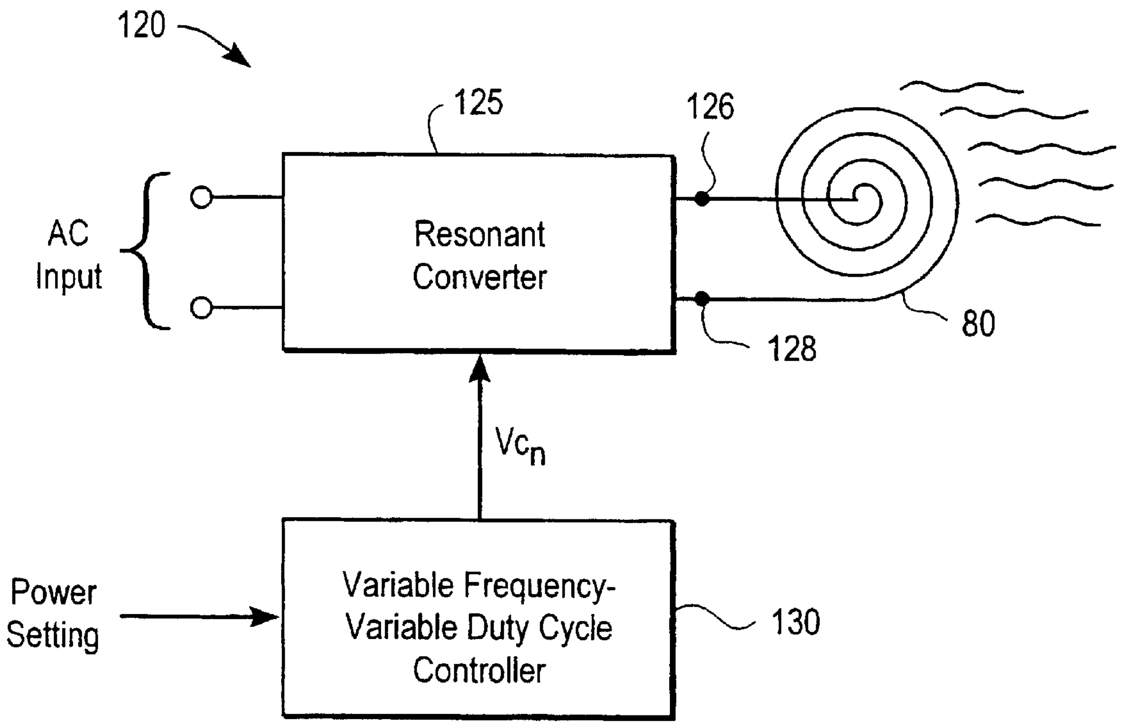
FIG. 3 illustrates the Inductive Heat Source of the present invention.

FIG. 3 illustrates, in block diagram form, the Inductive Heat Source 120 of the present invention. Unlike prior inductive heat sources, Inductive Heat Source 120 possesses a smooth, wide-range output. Inductive Heat Source 120 includes Resonant Converter 125, Controller 130 and Induction Coil 80. Resonant Converter 125 converts the AC input into a variable output power available between Nodes 126 and 128. Coupled between Nodes 126 and 128, Induction Coil 80 converts the output power into heat. The amount of output power. produced by Resonant Power Converter 125 depends upon a control voltage or voltages. Controller 130 generates its control voltage(s), $v_{cn}$, in response to one of three power settings, high, medium or low. Unlike prior controllers, Controller 130 varies both the frequency and duty cycle of its control voltage(s) for each power setting, producing a smooth wide-range output. In particular, the duty cycle of the control voltage(s) automatically decreases as the frequency increases.

Figure 4:
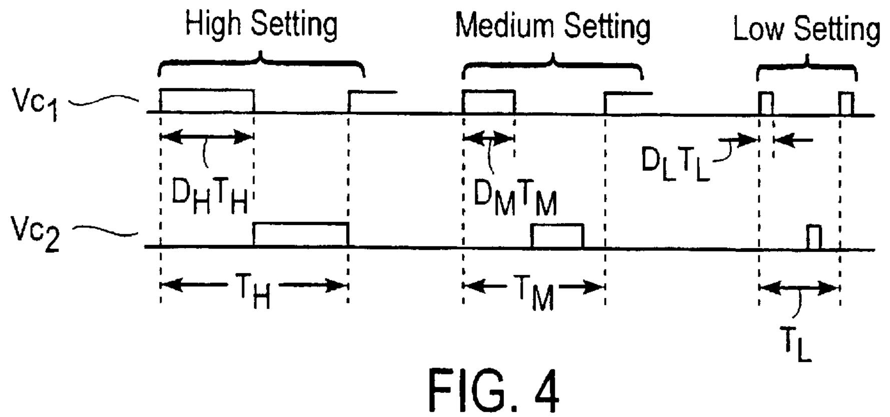
FIG. 4 illustrates complementary control voltages $v_{c1}$ and $v_{c2}$ produced by the Controller of FIG. 3 in response to high, medium and low power settings.

FIG. 4 illustrates complementary control voltages $v_{c1}$ and $v_{c2}$ produced by Controller 130 in response to high, medium and low power settings. The high setting produces a maximum duty cycle, $D_H$, of $v_{c1}$ and $v_{c2}$ and a maximum switching period, $T_H$. The medium power setting reduces the duty cycle of $v_{c1}$ and $v_{c2}$ to $D_M$ and the switching period to $T_M$. The low power setting further reduces the duty cycle of $v_{c1}$ and $v_{c2}$ to $D_L$ and the switching period to $T_L$. The control voltages generated in response to the lower power setting differ from those generated by prior art controllers in three ways. First, the control voltages generated in response to the low power switch every ½ low switching period, rather than including extended periods without switching. Second, the low switching period, $T_L$, is not equal to the medium switching period, $T_M$; and, third, the low duty cycle, $D_L$, is not equal to the medium duty cycle, $D_M$. Controller 130 produces a smooth wide-range output between Nodes 126 and 128 because $D_H > D_M > D_L$ and $T_H > T_M > T_L$.

A. Resonant Power Converter Embodiments

Figure 5:
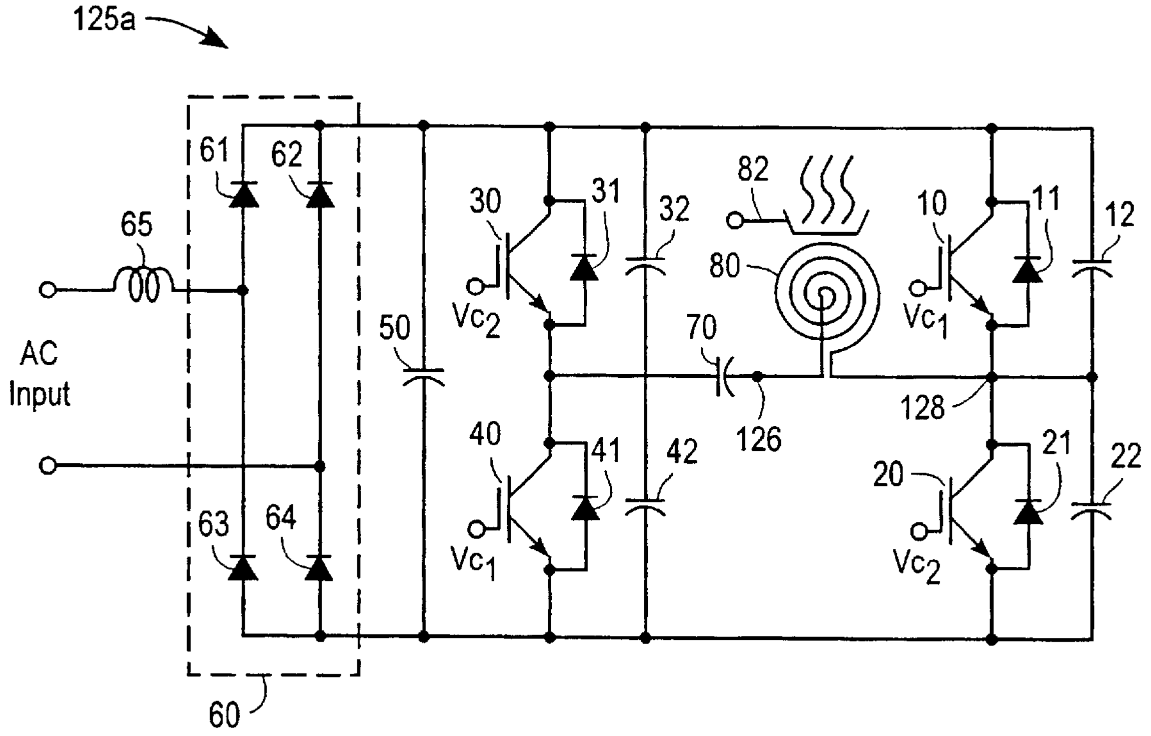
FIG. 5 illustrates a Full-Bridge Resonant Power Converter suitable for use with the Inductive Heat Source of FIG. 3.

FIG. 5 illustrates schematically a Full-Bridge Resonant Power Converter 125*a*, which is one of several possible embodiments of Resonant Power Converter 125. Full-Bridge Resonant Power Converter 125*a* includes Filter Inductor 65, Diode Bridge 60, Filter Capacitor 50, and Switches 10, 20, 30 and 40 and their associated Diode-Snubber Capacitor pairs. Capacitor 70 and Induction Coil 80 are the resonant elements. Induction Coil 80 heats cooking pan 82 in response to the power output across Nodes 126 and 128.

Control voltage $v_{c1}$ controls Switches 10 and 40, while control voltage $v_{c2}$ controls Switches 20 and 30. Across each Switch 10, 20, 30 and 40 is coupled a Diode-Snubber Capacitor pair 11 & 12, 21 & 22, 31 & 32, and 41 & 42. Diodes 11, 21, 31 and 41 allow negative directional current to flow while their associated Switches 10, 20, 30 and 40 are turned off. Snubber Capacitors 12, 22, 32 and 42 reduce the turn-off loss associated with their respective Switches 10, 20, 30 and 40. Snubber Capacitors 12, 22, 32 and 42 make zero-voltage switching desirable to improve power efficiency. Zero-voltage switching of Full-Bridge Resonant Power Converter 125*a* can be obtained using a switching frequency greater than the resonant frequency of the resonant power converter. To ensure a pure AC output across Nodes 126 and 128, the duty cycle of control voltages $v_{c1}$ and $v_{c2}$ must be less than 50%.

Figure 6:
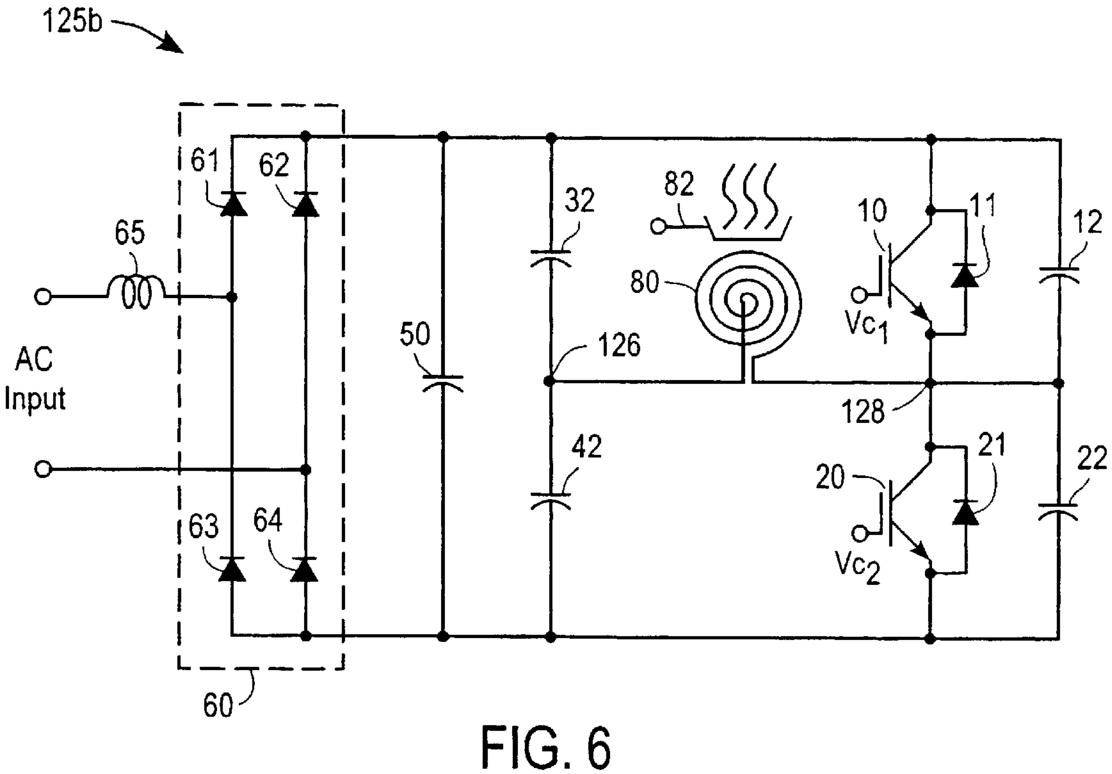
FIG. 6 illustrates a Half-Bridge Resonant Power Converter suitable for use with the Inductive Heat Source of FIG. 3.

FIG. 6 illustrates schematically a second embodiment of Resonant Power Converter 125, Half-Bridge Resonant Power Converter 125*b*. Half-Bridge Resonant Converter 125*b* includes Filter Inductor 65, Diode Bridge 60, Filter Capacitor 50, and a single pair of switches, Switches 10 and 20, and their associated Diode-Snubber Capacitor pairs, 11 & 12 and 21 & 22. The resonant elements are Capacitors 71 & 72 and Induction Coil 80. Control voltage $v_{c1}$ controls Switch 10, while control voltage $v_{c2}$ controls Switch 20. Zero-voltage switching of Half-Bridge Resonant Power Converter 125*b* can also be obtained using a switching frequency greater than the resonant frequency. To ensure a pure AC output across Nodes 126 and 128, the duty cycle of control voltages $v_{c1}$ and $v_{c2}$ again must be less than 50%.

Figure 7A:
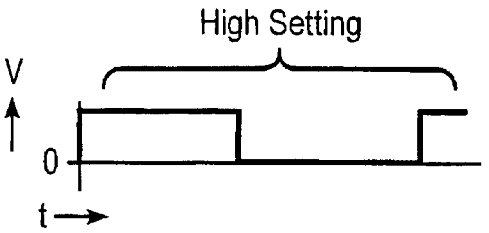
FIG. 7A illustrates control voltage $v_{c2}$ generated by the Controller of FIG. 3 in response to the high power setting.
Figure 7B:
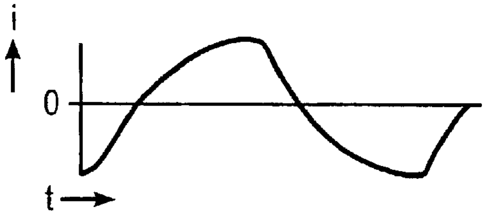
FIG. 7B illustrates the current through the Induction Coil 80 of FIG. 6 in the high power setting.
Figure 7C:
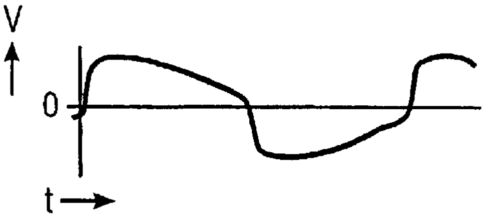
FIG. 7C illustrates the voltage across the Induction Coil 80 of FIG. 6 in the high power setting.
Figure 8C:
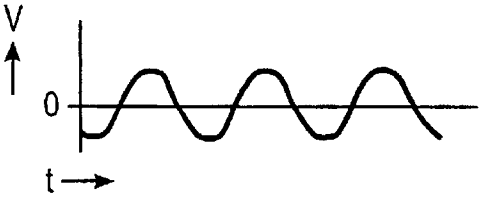
FIG. 8C illustrates the voltage across the Induction Coil 80 of FIG. 6 in the low power setting.
Figure 7D:
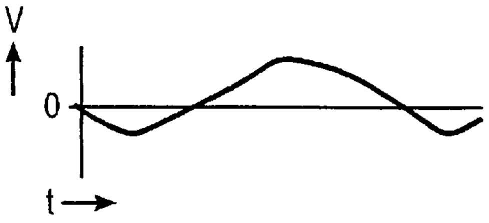
FIG. 7D illustrates the voltage at Node 126 of FIG. 6 in the high power setting.

FIGS. 7A, B, C and D illustrate the response of Half-Bridge Resonant Power Converter 125*b* to the high power setting. FIG. 7A illustrates control voltage $v_{c2}$ which is coupled to the gate of Switch 20. The duty cycle of $v_{c2}$ is approximately 50% and the switching frequency is slightly greater than resonant frequency. When Switch 20 turns on, the current through Induction Coil 80 begins increasing, as illustrated in FIG. 7B. The increase in current through Induction Coil 80 produces a positive voltage across it, as illustrated in FIG. 7C. FIG. 7D illustrates the voltage at Node 126, which voltage decreases as the current through Induction Coil 80 increases. This is the positive phase of operation. When control voltage $v_{c2}$ turns off Switch 20, control voltage $v_{c1}$ switches on Switch 10, and the current through Induction Coil 80 begins decreasing, as does the voltage across it. (See FIG. 7B and 7C) This is the negative phase of operation. The response of Half-Bridge Resonant Power Converter 125*b* during the positive phase of operation is symmetrical to its response during the negative phase of operation.

Figure 8A:
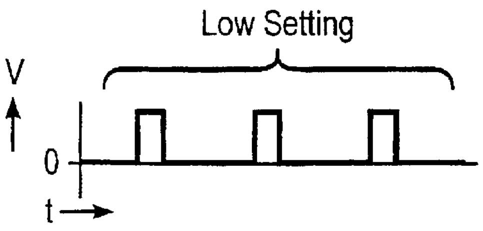
FIG. 8A illustrates the control voltage $v_{c2}$ generated by the Controller of FIG. 3 in response to the low power setting.
Figure 8B:
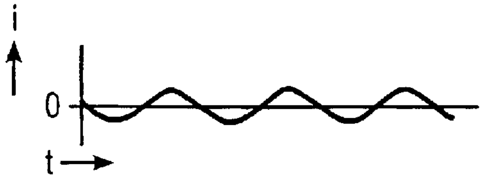
FIG. 8B illustrates the current through the Induction Coil 80 of FIG. 6 in the low power setting.
Figure 8D:
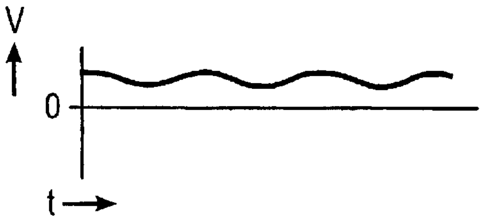
FIG. 8D illustrates the voltage at Node 126 of FIG. 6 in the low power setting.

FIGS. 8A, B, C and D illustrate the response of Half-Bridge Resonant Power Converter **125*b* to the low power setting. FIG. 8A illustrates the control voltage $v_{c2}$ generated in response to the low power setting. The duty cycle, $D_L$, of control voltage $v_{c2}$ is much less than 50%, approximately 10%, and the switching frequency is much higher than the resonant frequency of Half-Bridge Resonant Power Converter 125*b*, approximately three times that of the high power setting. These changes in control voltage $v_{c2}$ lead to reductions in the amplitude of the current through, and the voltage across, Induction Coil 80. (See FIGS. 8B and C) Further, as illustrated in FIG. 8D, the voltage at Node 126 remains nearly constant at approximately one-half of the DC bus voltage. Because the power output by Resonant Power Converter 125*b*** is not interrupted even heating occurs at all three power settings.

Figure 9A:
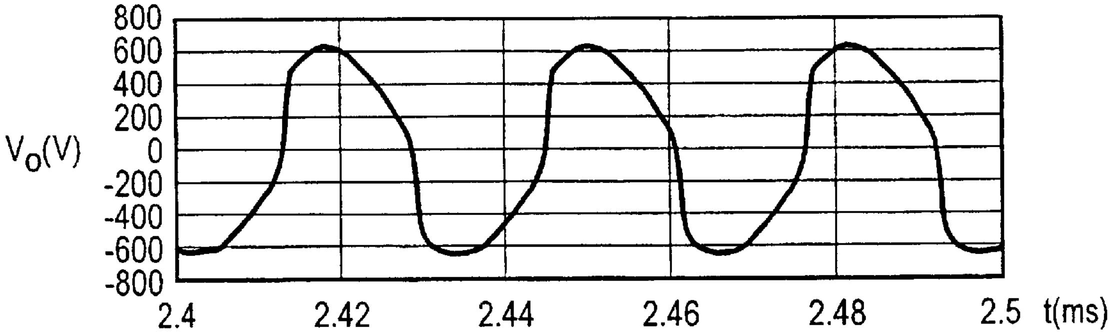
FIG. 9A illustrates the voltage across Induction Coil 80 of FIG. 6 given an AC input voltage of 208V, 60 Hz and a high power setting.
Figure 9B:
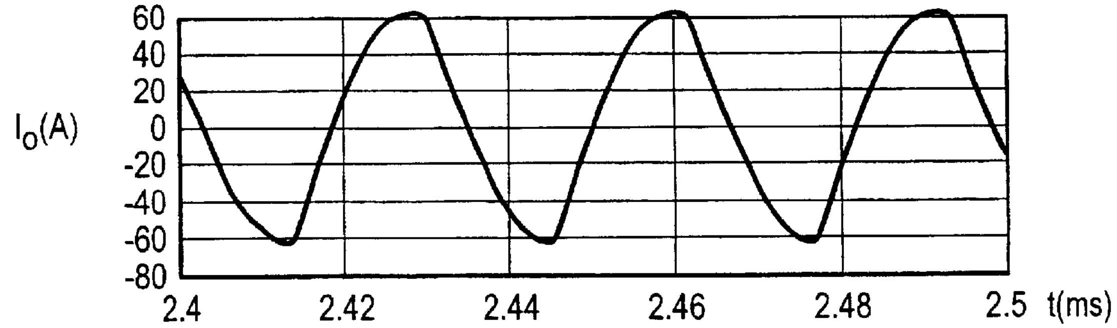
FIG. 9B illustrates the current through Induction Coil 80 of FIG. 6 given an AC input voltage of 208V, 60 Hz and a high power setting.

FIGS. 9A & B illustrate the response of Half-Bridge Resonant Power Converter **125*b* given an AC input voltage of 208V, 60 Hz and a high power setting. In particular, FIG. 9A illustrates the voltage across Induction Coil 80 under the input conditions, while FIG. 9B illustrates the current through Induction Coil 80**.

Figure 10A:
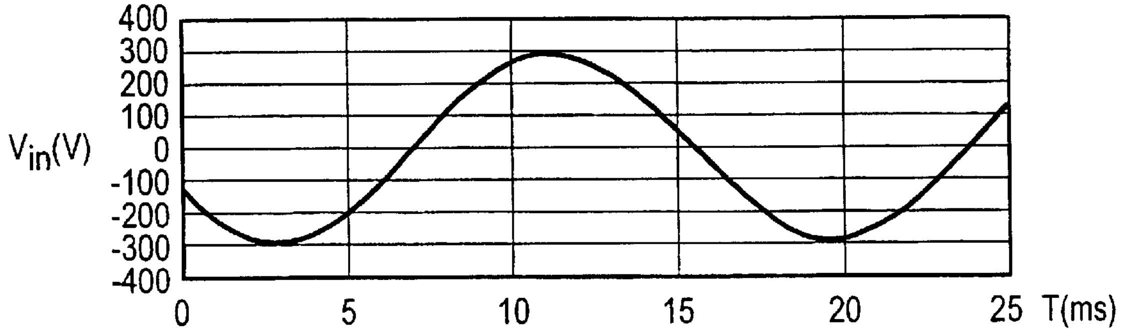
FIG. 10A illustrates the voltage across Induction Coil 80 of FIG. 6 given an AC input voltage of 208V, 60 Hz and a low power setting.
Figure 10B:
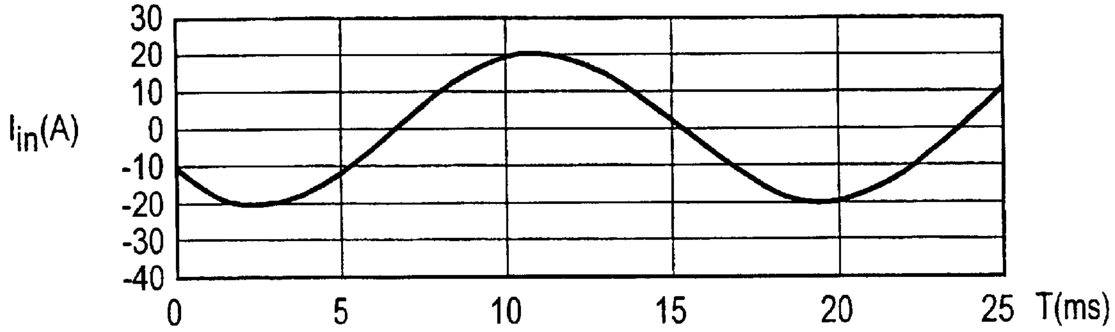
FIG. 10B illustrates the current through Induction Coil 80 of FIG. 6 given an AC input voltage of 208V, 60 Hz and a low power setting.

FIGS. 10A & B illustrate the response of Half-Bridge Resonant Power Converter **125*b* given a low power setting and the same AC input voltage. FIG. 10A graphs the voltage across Induction Coil 80, while FIG. 10B graphs the current through Induction Coil 80**.

Figure 11:
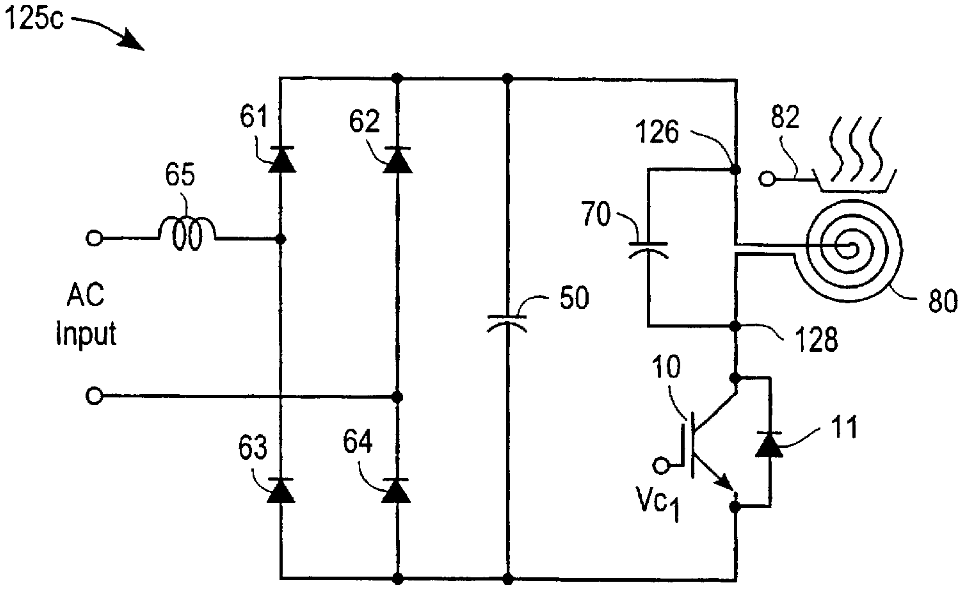
FIG. 11 illustrates a first Single-Ended Resonant Power Converter suitable for use in the Inductive Heat Source of FIG. 3.
Figure 12:
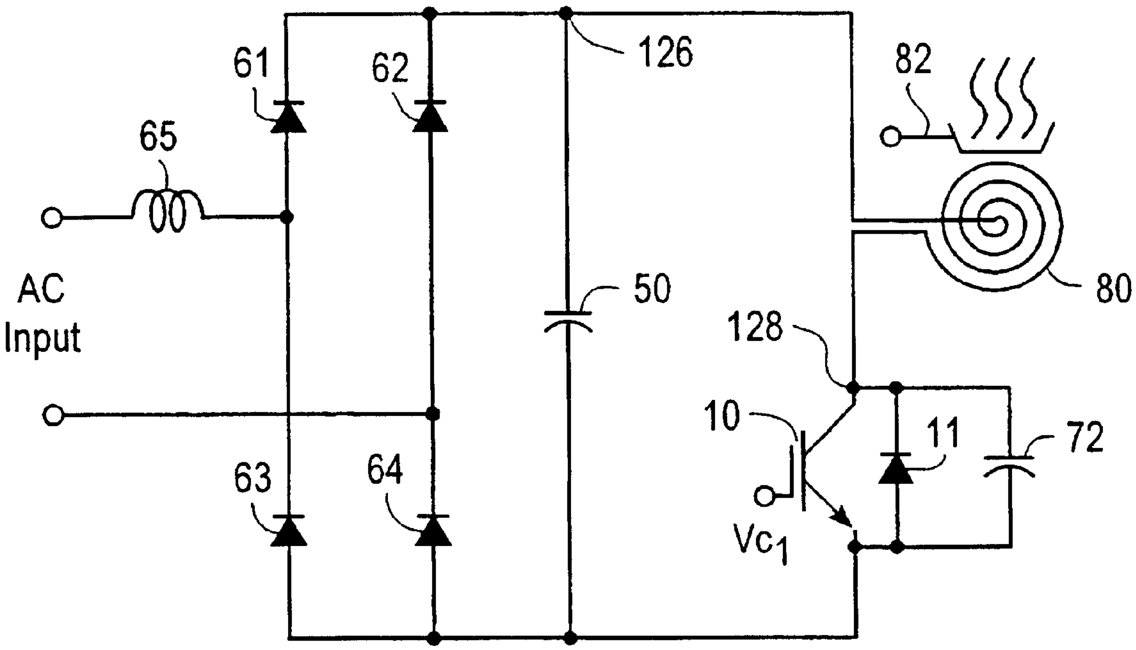
FIG. 12 illustrates a second Single-Ended Resonant Power Converter suitable for use in the Inductive Heat Source of FIG. 3.

FIG. 11 illustrates schematically a third embodiment of Resonant Power Converter 125, Single-Ended Resonant Power Converter **125*c*. FIG. 12 illustrates schematically a third embodiment of Resonant Power Converter 125, Single-Ended Resonant Power Converter 125*d*. Both Single-Ended Resonant Power Converters 125*c* and 125*d* include a single switch, Switch 10, which is controlled by control voltage $v_{c1}$. Single-Ended Resonant Power Converters 125*c* and 125*d* differ in the connection of their resonant capacitors. FIG. 11 depicts Resonant Capacitor 70 connected across Induction Coil 80, while FIG. 12 show Resonant Capacitor 72 connected across Switch 10. Despite this difference, the operating principle of Single-Ended Resonant Power Converters 125*c* and 125*d* is the same. While control voltage $v_{c1}$ causes Switch 10 to conduct, Induction Coil 80 charges. When control voltage $v_{c1}$ causes Switch 10 to cease conduction, Induction Coil 80 and Resonant Capacitor 70 or 72 resonate. Zero-voltage switching is achieved in both Single-Ended Resonant Power Converts 125*c* and 125*d*** using a switching frequency greater than the resonant frequency.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, a variable frequency, variable duty cycle controller may be used to control resonant power supplies.

What is claimed is:

1. An inductive heat source, comprising:

a controller generating a control voltage in response to a power setting, the control voltage having a variable frequency and a variable duty cycle, the variable duty cycle decreasing in response to an increase in the variable frequency;

a resonant converter generating an output power between a first node and a second node in response to the control voltage; and an induction coil coupled between the first node and the second node, the induction coil producing an amount of heat depending upon a value of the output power.

2. The inductive heating source of claim 1, wherein the resonant converter is selected from the group consisting of a full-bridge resonant power converter, a half-bridge resonant power converter and a single-ended resonant power converter.

3. The inductive heating source of claim 1, wherein the resonant converter includes a switch, and wherein the switch is associated with a capacitor configured to reduce turn-off loss associated with the switch.

4. The inductive heating source of claim 1, wherein the control voltage has a switching frequency of greater than a resonant frequency of the resonant converter in order to produce zero-voltage switching.

5. The inductive heating source of claim 1, wherein the power setting is chosen from a high power setting, a medium power setting and a low power setting.

6. The inductive heating source of claim 5, wherein a duty cycle for the control voltage at the high power setting is greater than a duty cycle for the control voltage at the medium power setting, and wherein the duty cycle for the control voltage at the medium power setting is greater than a duty cycle for the control voltage at the low power setting.

7. The inductive heating source of claim 5, wherein a switching period for the control voltage at the high power setting is greater than a switching period for the control voltage at the medium power setting, and wherein the switching period for the control voltage at the medium power setting is greater than a switching period for the control voltage at the low power setting.

8. The inductive heating source of claim 5, wherein the high power setting causes the control voltage to have a duty cycle of about 50% and a switching frequency greater than a resonant frequency for the resonant converter.

9. The inductive heating source of claim 5, wherein the low power setting causes the control voltage to have a duty cycle of about 10% and a switching frequency about three times a switching frequency of the resonant converter at the high power setting.

10. A method of inductive heating, comprising:

generating a control voltage in response to a power setting, the control voltage having a variable frequency and a variable duty cycle, the variable duty cycle decreasing in response to an increase in the variable frequency;

generating an output power in response to the control voltage; and producing an amount of heat depending upon a value of the output power.

11. The method of inductive heating of claim 10, wherein generating includes using a full-bridge resonant power converter, a half-bridge resonant power converter or a single-ended resonant power converter.

12. The method of inductive heating of claim 10, wherein the power setting is chosen from a high power setting, a medium power setting and a low levels.

13. The method of inductive heating of claim 12, wherein a duty cycle for the control voltage at the high power setting is greater than a duty cycle for the control voltage at the medium power setting, and wherein the duty cycle for the control voltage at the medium power setting is greater than a duty cycle for the control voltage at the low power setting.

14. The method of inductive heating of claim 12, wherein a switching period for the control voltage at the high power setting is greater than a switching period for the control voltage at the medium power setting, and wherein the switching period for the control voltage at the medium power setting is greater than a switching period for the control voltage at the low power setting.

15. The method of inductive heating of claim 12, wherein the high power setting generates the control voltage with a duty cycle of about 50% and a switching frequency greater than a resonant frequency for the resonant converter.

16. The method of inductive heating of claim 12, wherein the low power setting generates the control voltage with a duty cycle of about 10% and a switching frequency about three times the switching frequency of the resonant converter at the high power setting.

* * * * *